Figure 1:
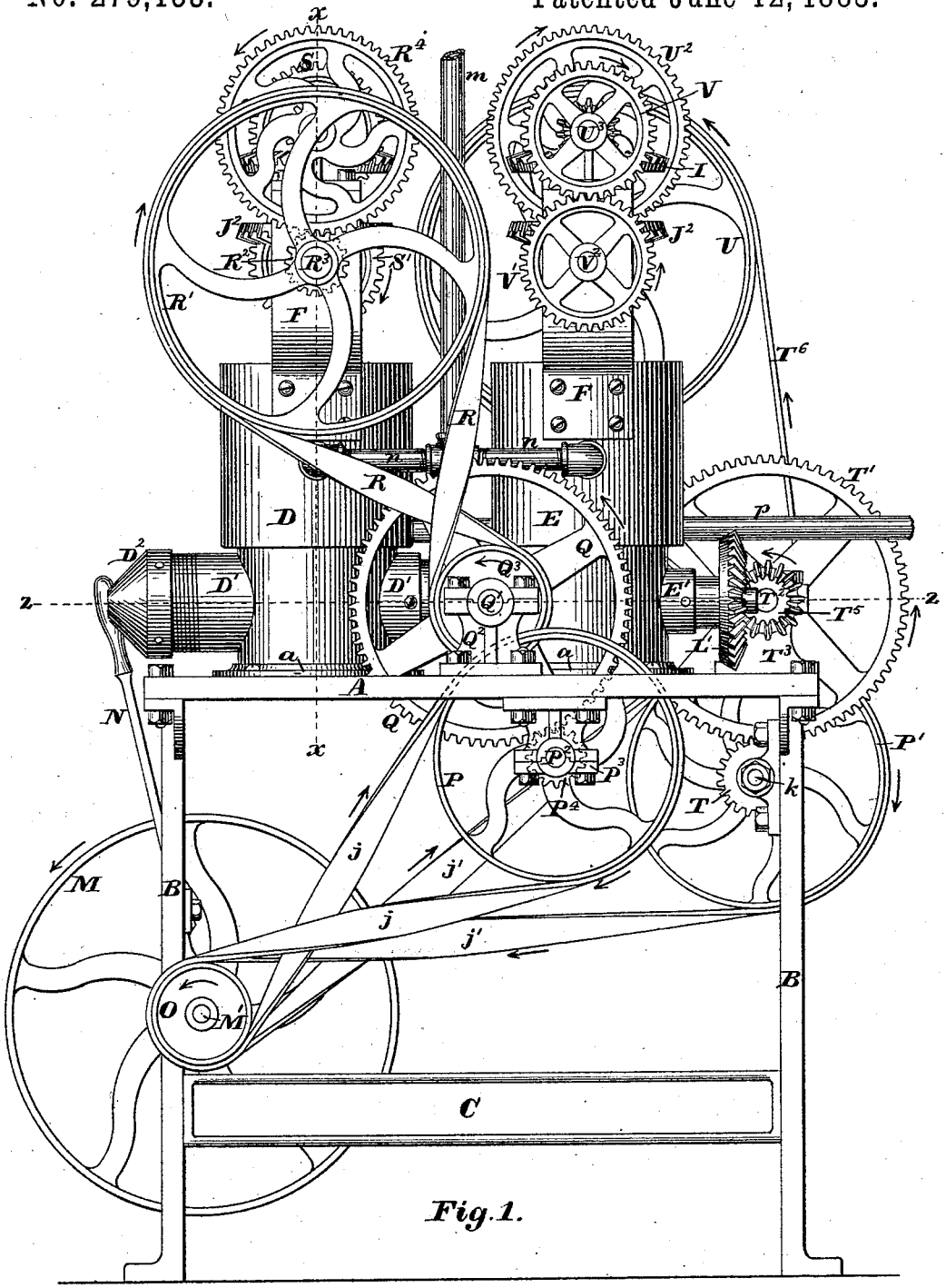

(No Model.) 5 Sheets—Sheet 1.

O. R. CHASE.
MACHINE FOR MOLDING, SHAPING, AND COMBINING CONFECTIONERY AND OTHER PLASTIC MATERIALS.

No. 279,133. Patented June 12, 1883.

Witnesses:
W. H. Chapman
Walter E. Lombard.

Inventor:
Oliver R. Chase
by N. C. Lombard
Attorney.

(No Model.) 5 Sheets—Sheet 2.

O. R. CHASE.
MACHINE FOR MOLDING, SHAPING, AND COMBINING CONFECTIONERY AND OTHER PLASTIC MATERIALS.

No. 279,133. Patented June 12, 1883.

Witnesses:
W. H. Chapman
Walter E. Lombard

Inventor:
Oliver R. Chase
by N. C. Lombard
Attorney.

(No Model.) 5 Sheets—Sheet 3.

O. R. CHASE.
MACHINE FOR MOLDING, SHAPING, AND COMBINING CONFECTIONERY
AND OTHER PLASTIC MATERIALS.

No. 279,133. Patented June 12, 1883.

Witnesses:
W. H. Chapman
Walter E. Lombard

Inventor:
Oliver R. Chase
by N. C. Lombard
Attorney.

(No Model.) 5 Sheets—Sheet 5.
O. R. CHASE.
MACHINE FOR MOLDING, SHAPING, AND COMBINING CONFECTIONERY AND OTHER PLASTIC MATERIALS.

No. 279,133. Patented June 12, 1883.

Witnesses:
W. H. Chapman
Walter E. Lombard

Inventor:
Oliver R. Chase
by N. C. Lombard
Attorney.

UNITED STATES PATENT OFFICE.

OLIVER R. CHASE, OF BOSTON, MASSACHUSETTS.

MACHINE FOR MOLDING, SHAPING, AND COMBINING CONFECTIONERY AND OTHER PLASTIC MATERIALS.

SPECIFICATION forming part of Letters Patent No. 279,133, dated June 12, 1883.

Application filed January 20, 1883. (No model.)

*To all whom it may concern:*

Be it known that I, OLIVER R. CHASE, of Boston, in the county of Suffolk and State of Massachusetts, have invented certain new and useful Improvements in Machines for Working, Shaping, and Combining Confectionery and Plastic Materials, of which the following, taken in connection with the accompanying drawings, is a specification.

My invention relates to a machine for working, shaping, and combining plastic materials, and is especially adapted for use in the manufacture of confectionery and certain kinds of soap, and is designed more especially for combining two colors of plastic material by inserting one within the other, and at the same time giving to each of said different colored materials any desired outline whereby the finished article may be rendered ornamental; and it consists, first, in the employment in the receiver-cylinder of two screw-pistons, one having a right-hand spiral blade and the other a left-hand spiral blade, in combination with mechanism for revolving said screw-pistons in opposite directions.

It further consists in the combination of two receiving-cylinders arranged side by side, and each provided with one or more screw-pistons; a hollow screw arranged beneath one of said receivers in a horizontal position, and having its bearing in a horizontal cylinder having free communication upon its upper side with said receiver, and a second horizontal screw arranged beneath both of said receiving-cylinders, and having its bearing partly within the hollow screw before mentioned, beneath the forward receiving-cylinder, and partly in a fixed tube or cylinder located beneath the rear receiving-cylinder and open thereto upon its upper side, and mechanism for imparting to said horizontal screws independent rotary motions, as will be further described.

It further consists in the combination of two receiving-cylinders, each provided with one or more revolving screw-pistons; a hollow screw arranged to fit and be revolved within a horizontal cylinder beneath and projecting from one of said receivers; a second screw arranged beneath the other receiver, and having its bearing partly within a fixed horizontal cylinder beneath said last-mentioned cylinder, and partly within said hollow screw; a discharge-nozzle removably attached to the front of said hollow screw, and a second discharge-nozzle removably attached to the front end of the horizontal cylinder in which said hollow screw works, and encompassing and extending beyond said first-mentioned nozzle.

It further consists in the combination, with the receiving-cylinders, of a machine for working, shaping, and combining plastic materials, of a steam-jacket encompassing said cylinder, and means of conveying steam or hot water thereto, as will be more particularly described.

It further consists in certain combinations and arrangements of parts, which will be best understood by reference to the description of the drawings, and to the claims to be hereinafter given.

Figure 2:
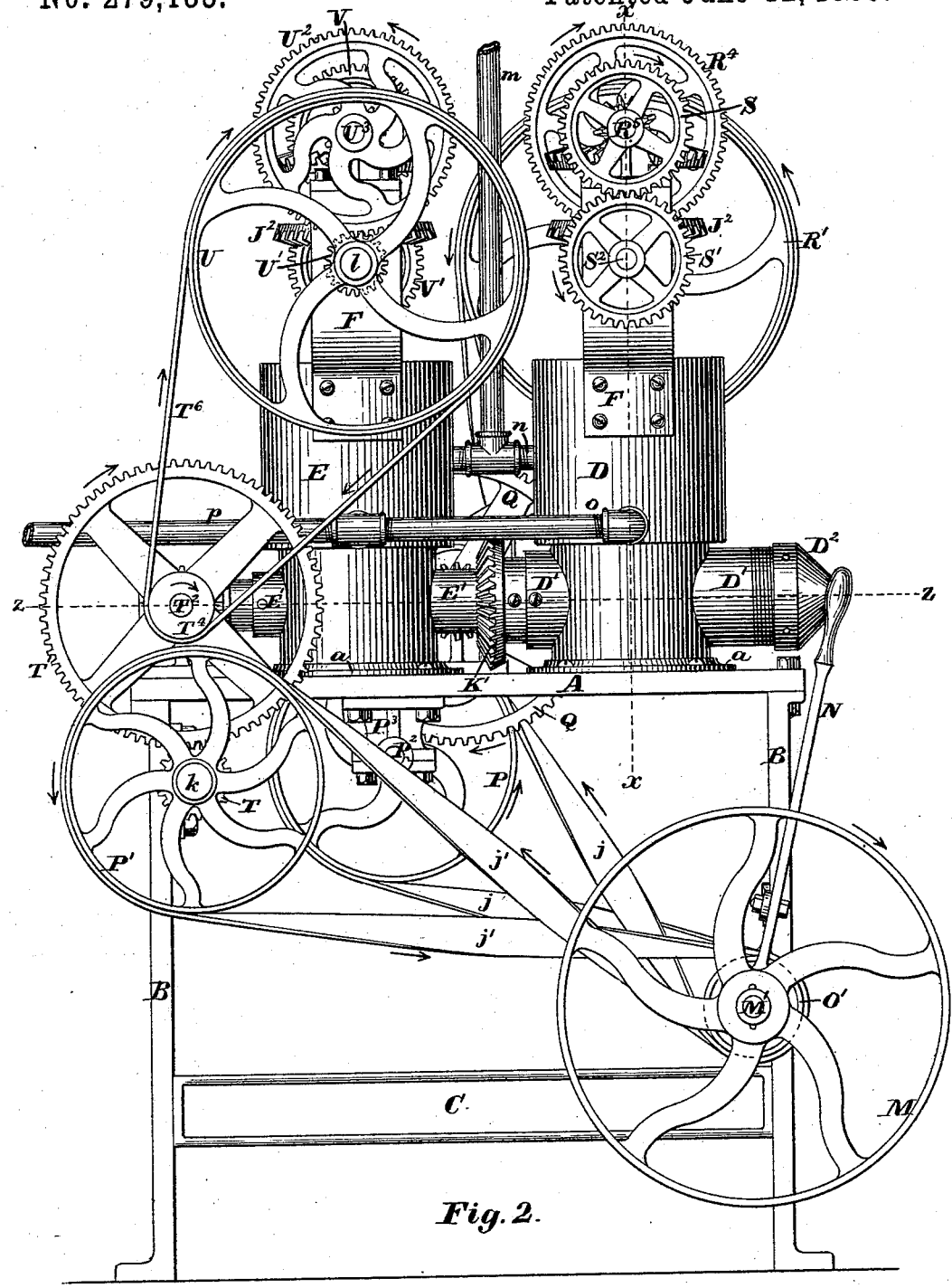
Figure 3:
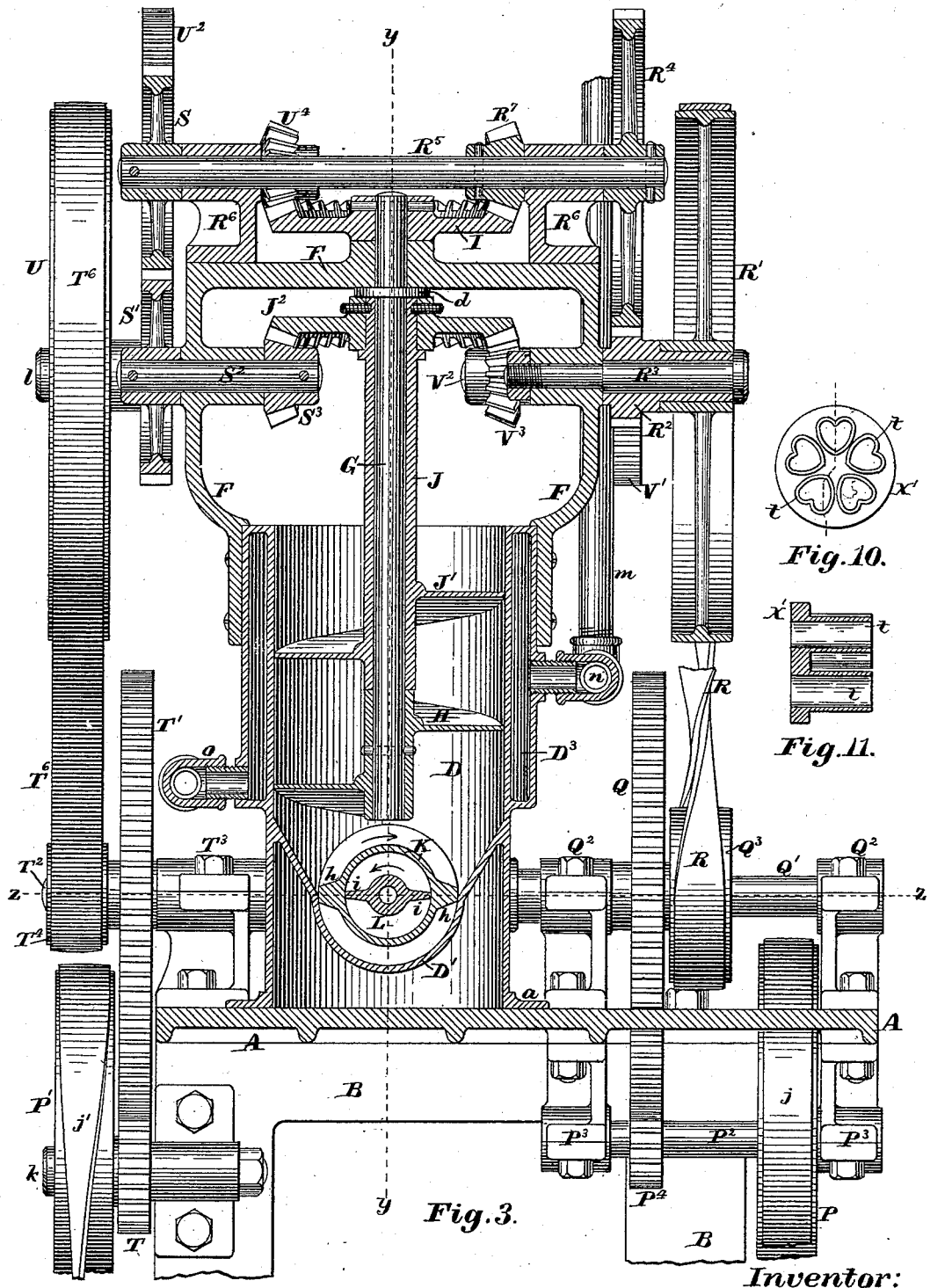
Figure 4:
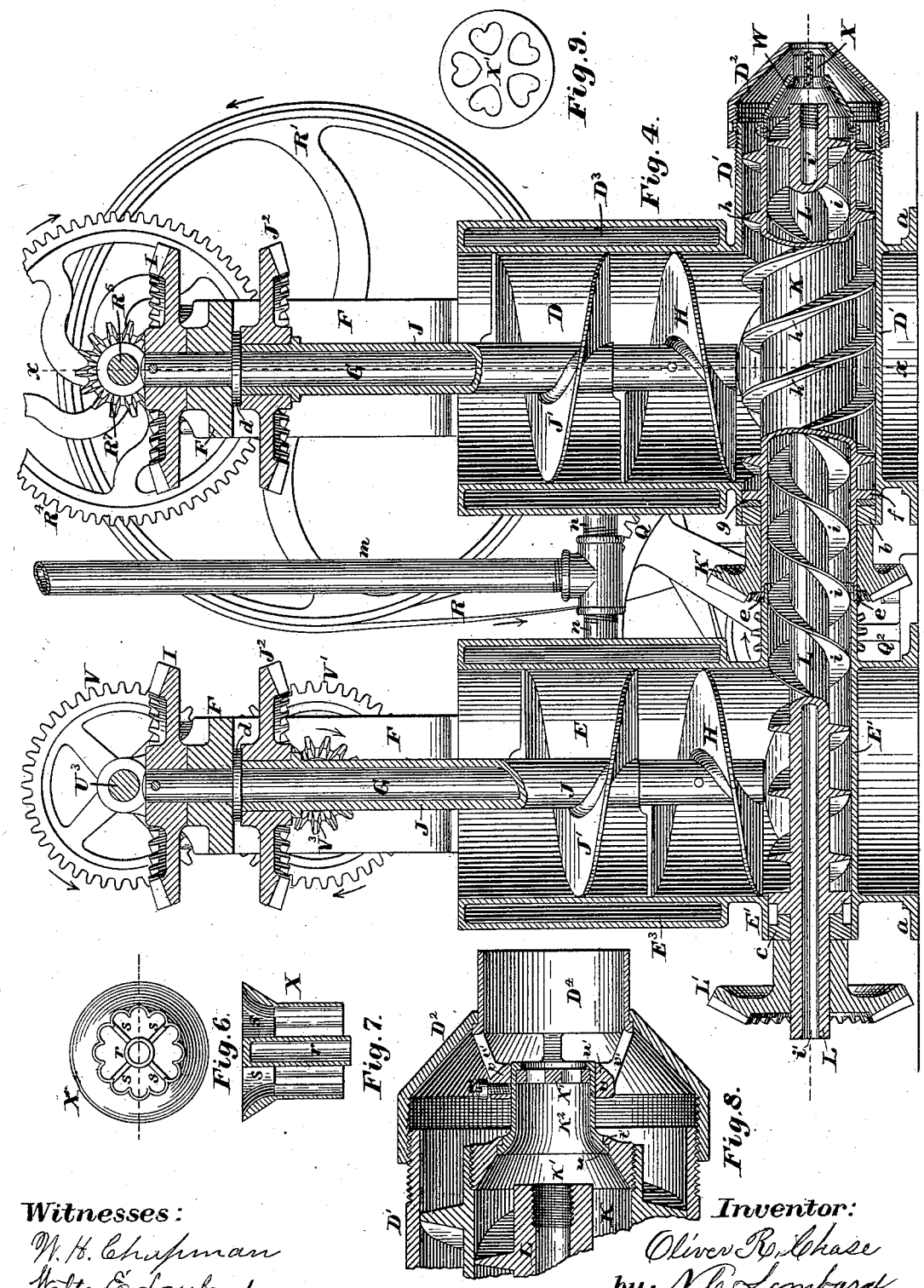
Figure 5:
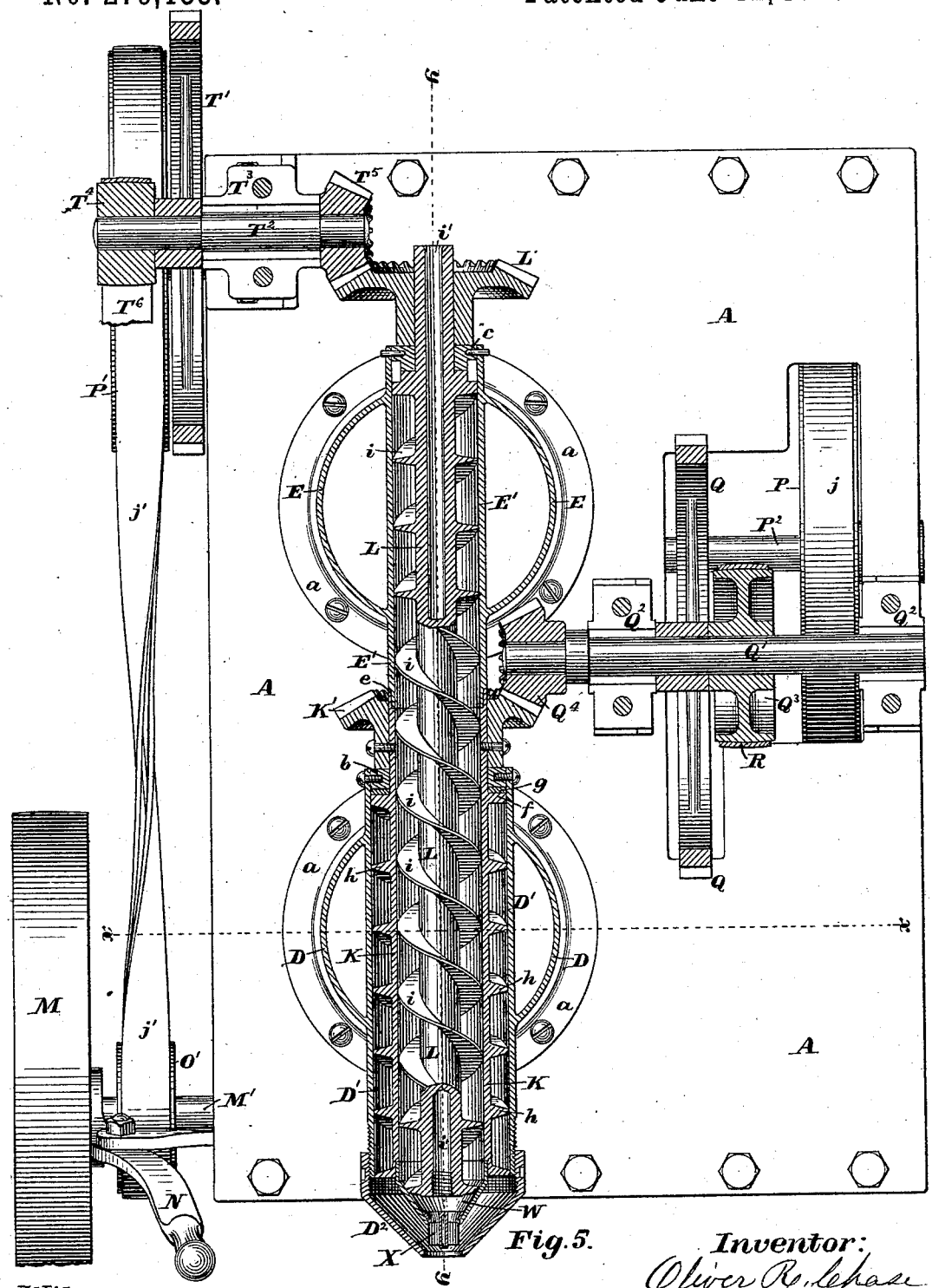

Figure 1 of the drawings is a side elevation of a machine embodying my invention. Fig. 2 is an elevation of the opposite side. Fig. 3 is a vertical section on line *x x* on Figs. 1 and 2. Fig. 4 is a vertical section on line *y y* on Fig. 3. Fig. 5 is a horizontal section on line *z z* on Figs. 3 and 4; and Figs. 6 and 7 are, respectively, an end elevation and a longitudinal section of the supplementary discharge-nozzle of the hollow screw. Fig. 8 is a partial longitudinal section through the horizontal screws, illustrating a modification of the discharge-nozzles; and Fig. 9 is an elevation of the removable disk mounted in the inner nozzle; and Figs. 10 and 11 are, respectively, an end view and longitudinal section of a modified form of said removable disk.

A is the table or bed of the machine, supported upon the frames B B, connected together by the tie-girts C C.

D and E are two receiving-cylinders, each provided with a base-flange, *a*, by means of which and suitable bolts they are firmly secured to the table A, as shown. The receiver-cylinder D has formed in one piece therewith the horizontal cylinder D', which projects beyond said cylinder D, upon opposite sides, as shown in Figs. 1 and 2, and closes the bottom of said cylinder D and communicates therewith upon its upper side, as shown in Fig. 3. The front end of the cylinder D' has formed thereon a male screw-thread, to which is fitted the conical discharge-nozzle D², and the rear end of said cylinder D' has secured therein the inwardly-projecting flange or collar *b*, as shown in Figs. 4 and 5. The receiver-cylinder E also has formed in one piece therewith a similar horizontal cylinder, E', of somewhat smaller diameter than the cylinder D', but in axial line therewith, and extending beyond said cylinder E upon opposite sides thereof, and closing the lower end of the cylinder E, and communicating therewith upon its upper side, substantially as shown and described in regard to to the cylinder D', the rear end of said cylinder E' being partially closed by the annular head $c$, as shown in Figs. 4 and 5.

F F are frames secured to the upper ends of the receiver-cylinders D and E, one to each, and each having formed in its cross-bar a bearing to receive the pendent shaft G, upon the lower end of which is firmly secured the screw-piston H, the periphery of the spiral blades of which just fits the interior of the receiver-cylinder in which it is mounted and arranged to revolve. Each of the shafts G is provided with a collar, $d$, which bears against the cross-bar of its frame F and takes the upward thrust of said shaft, and has secured to its upper end a bevel-gear wheel, I, which bears upon the upper side of the cross-bar of the frame F, as shown in Figs. 3 and 4.

J J are hollow or sleeve shafts, mounted upon the shafts G, and each having formed upon its lower end a screw-piston, J', similar to the screw-piston H, except that the spiral blade of the screw is wound in the opposite direction to that on H, or, in other words, one of said screws has a right-hand thread and the other a left-hand thread, as shown. The sleeve-shaft J has secured upon its upper end the bevel-gear wheel $J^2$.

K is a cylinder open at both ends, and having an interior diameter corresponding to the interior diameter of the cylinder E', with which it is connected at its rear end by a slip-joint, (shown at $e$, Figs. 4 and 5,) and having a bearing in the collar $b$, and provided just forward of said collar $b$ with an outwardly-projecting collar or flange, $f$, between which and the collar $b$ is placed the annular washer $g$, to take the rearward thrust of said screw-cylinder. The exterior of the cylinder K, forward of the flange $f$, has formed thereon a double right-hand spiral thread, $h$, the periphery of which just fits the interior of the cylinder D', and in the rear of the cylinder D' it has secured thereon a bevel-gear wheel, K', by which it may be revolved.

L is a second screw, provided with a double left-hand spiral thread, $i$, and having its bearings in the head $c$ of the cylinder E', and in the cylinder E', and the hollow screw-cylinder K, in which it is revolved in a direction opposite to the revolution of the screw-cylinder K $h$ by means of the bevel-gear wheel L', and other mechanism, to be hereinafter described.

The mechanism for revolving the several screws is as follows:

M is the main driving-pulley, mounted loosely upon the shaft M', and adapted to be connected to said shaft and cause it to revolve therewith by means of the shipper-lever N and a suitable clutch. The shaft M' has secured thereon the two pulleys O and O', from which the crossed belts $j$ and $j'$ lead, respectively, to the pulleys P and P'. The pulley P is mounted upon the short shaft $P^2$, having its bearings in the boxes $P^2$ $P^3$, and carrying the spur-pinion $P^4$, which engages with and imparts motion to the spur-gear wheel Q, mounted upon the shaft Q', which has its bearings in the boxes $Q^2$ $Q^2$, and has secured thereon the pulley $Q^3$, and the bevel-pinion $Q^4$, as shown in Figs. 1, 4, and 5. The bevel-pinion $Q^4$ engages with and imparts motion to the bevel-gear wheel K', to revolve the hollow screw K $h$, and the pulley $Q^3$, acting through the medium of the crossed belt R, imparts motion to the pulley R', mounted upon the hub of the spur-pinion $R^2$, which in turn has its bearing upon the fixed stud $R^3$, and engages with and imparts motion to the spur-gear wheel $R^4$, mounted upon the shaft $R^5$, mounted in the boxes $R^6$, and carrying the bevel-pinion $R^7$, which engages with and imparts motion to the bevel-gear wheel I upon the upper end of the screw-shaft G, which works in the cylinder D. The shaft $R^5$ also has secured thereon the spur-gear wheel S, which meshes into and rotates the spur-gear wheel S', mounted upon the outer end of the short shaft $S^2$, which has its bearing in the frame F, and has secured upon its inner end the bevel-pinion $S^3$, which engages with and imparts motion to the bevel-gear wheel $J^2$, to revolve the hollow screw-shaft J within the receiver-cylinder D.

The pulley P' is mounted upon the hub of the spur-pinion T, which has its bearing upon the stud $k$, and meshes into and imparts motion to the spur-gear wheel T', mounted upon the short shaft $T^2$, having its bearing in the box $T^3$, and having secured thereon the pulley $T^4$ and the bevel-pinion $T^5$, which latter engages with the bevel-gear wheel L' to revolve the screw L, as shown in Fig. 5. The pulley $T^4$, acting through the open belt $T^6$, imparts motion to the pulley U, mounted upon the hub of the pinion U', which has its bearing upon a fixed stud, $l$, and engages with and imparts motion to the spur-gear wheel $U^2$, mounted upon the shaft $U^3$, having its bearings in stands or boxes upon the frame F, secured to the cylinder E, and having secured thereon the bevel-pinion $U^4$, which engages with the bevel-gear wheel I to revolve the screw-piston G H in the receiver-cylinder E. The shaft $U^3$ also has secured thereon the spur-gear wheel V, which engages with and imparts motion to a similar wheel, V', mounted upon a short shaft, $V^2$, which has its bearing in the frame F, secured to the top of the receiving-cylinder E, and has secured upon its inner end the bevel-pinion $V^3$, which engages with the bevel-gear wheel $J^2$ to revolve the hollow screw-piston J within the receiving-cylinder E.

The upper portions of the receiving-cylinders D and E are jacketed, so as to form annular chambers $D^3$ and $E^3$, surrounding the same, into which steam, hot air, or water may be admitted through the pipes $m$ and $n$, discharge-pipes o and p being provided as a means for keeping up the circulation of the heating medium and discharging from said annular chamber any water that may accumulate therein from the condensation of the steam.

W is a removable conical discharge-nozzle, secured to and revolving with the hollow screw K, its discharge-orifice being somewhat in the rear of the orifice of the nozzle D², and of a somewhat smaller diameter.

X is a supplementary nozzle, fitted within the orifice of the nozzle W, for use when it is desired to give to the central core of the molded article an ornamental shape or design, and it may be made as shown to an enlarged scale in Figs. 6 and 7, or of any other desired design—as, for instance, the central hub, r, and the radial arms s s may be dispensed with; or it may be a flat disk with one or more ornamental openings cut therethrough, as shown at s' in Figs. 8 and 9, or a disk with a series of tubes projecting therefrom and surrounding the openings in said disk, as shown in Figs. 10 and 11, in which X' is the disk; s', the opening through the same, and t the tubes surrounding said openings and projecting from the radial face of the disk, as shown. Again, the orifice through the nozzle D² may be circular, as shown in Figs. 4 and 5, or corrugated, like the nozzle X, or of any other desired shape, according to the exterior form that it is desired to give to the stick of candy or bar of soap.

In the modification illustrated in Fig. 8 the front end of the hollow screw K has screwed therein the ring k', provided with the inwardly-projecting annular lip or shoulder t', within which is fitted by a slip-joint the short tube K², provided at one end with the outwardly-projecting flange u and at the other end with the inwardly-projecting flange u', said latter flange serving as an abutment to support the perforated disk X', with or without the projecting tubes t. (Shown in Figs. 10 and 11.)

D⁴ is a short tube, which may be circular or of any other desired shape in cross-section, and is secured in a fixed position in the orifice of the conical nozzle D², and has cast in one piece therewith the ring v, connected to said tube by the arms v' v', said ring being fitted closely upon and secured by the set-screw w to the outer end of the tube K², all so fitted and arranged that the tubes D⁴ and K² remain stationary, while the ring k' in the end of the hollow screw K revolves around the tube K².

If it is desired to produce a stick of confectionery or a bar of soap having a circular center of one color covered by an envelope or even thickness of another color, the cylinders D and E are supplied with the necessary material in a plastic state and of the desired color, and the disk X' is removed, when, if the several screws are set in motion, the paste placed in the cylinder E will be discharged through the tube K² to meet at the end of said tube and be enveloped by an annular mass of the paste placed in the cylinder D, the two bodies of plastic substance being forced together through the tube D⁴, the outer body being compacted and pressed upon the inner body and made to adhere thereto by such passage.

If it is desired to produce a stick of confectionery or bar of soap having a cylindrical exterior of one color and an interior composed in part of the same color and in part of another color, the disk X' is inserted in the mouth of the tube K², said disk having cut through it a series of openings—such as are shown in Fig. 9, or of any desired shape—through which a series of bars or sticks of paste of one color are forced, to be united, as before described, with a paste of another color, which envelops each individual stick or bar, filling the spaces between them and filling the tube D⁴, as before.

If the paste being used is quite soft, the openings in the disk X' will need to be prolonged by means of tubes surrounding them and projecting from the outer face of said disk, as illustrated in Figs. 10 and 11, in order that the several lines of paste being forced through said openings shall be supported in substantial parallelism until they are substantially enveloped by the other colored paste coming from the cylinder D.

The screw L has an axial hole, i', extending through its entire length, the object of which is twofold, as follows: In some cases I propose to pass through said hole, from the rear to the front, a strip of paper or other material having printed or otherwise marked thereon a series of mottoes, which strip is drawn through said hole by the passage of the plastic material being delivered through the tube K², (the disk X' having been previously removed therefrom,) and thus the series of mottoes are incorporated in the center of the stick of confectionery.

In the manufacture of certain other kinds of confectionery I propose to couple the rear end of the screw L to a mechanism adapted to force a jet of cold air through the center of said screw for the purpose of cooling the paste at the front end of the machine, or at the point where it is being shaped to the desired form.

What I claim as new, and desire to secure by Letters Patent of the United States, is—

1. In a machine for working and shaping plastic materials, the combination of a receiving-cylinder, a right-hand screw-piston and a left-hand screw-piston, both arranged to work in said cylinder, and mechanism for revolving said screw-pistons in opposite directions, substantially as and for the purposes described.

2. The combination of two receiving-cylinders, one or more screw-pistons working in each of said receiver-cylinders, a hollow screw arranged in a horizontal position beneath one of said receiver-cylinders and within a cylindrical casing for a portion of its length, a second horizontal screw in axial line with said hollow screw and extending through said hollow screw, and having its bearing partly therein and partly within a fixed horizontal cylinder beneath, and projecting from the other receiver-cylinder, and mechanism for imparting to all of said screws independent rotary motions, substantially as described.

3. The combination of the receiving-cylinders D and E, provided, respectively, with horizontal cylinders D' and E', one or more screw-pistons arranged to revolve in each of said receiver-cylinders, the two horizontal screws K $h$ and L $i$, and the nozzles $D^2$ and W, all constructed, arranged, and adapted to operate substantially as and for the purposes described.

4. In a machine for working and shaping plastic materials, the combination of one or more receiving-cylinders provided with an annular chamber surrounding the same, means of causing a circulation of steam or hot water through said annular chamber, and one or more screw-pistons arranged within said receiver-cylinder, substantially as described.

5. In a machine for working, shaping, and combining plastic materials, the combination of the cylinders D' and E', the screws K $h$ and L $i$, the removable non-revolving nozzle $D^2$, the revolving nozzle W, and the loose molding-nozzle X, all arranged and adapted to operate substantially as and for the purposes described.

6. The combination of the cylinder E', provided with the conical discharge-nozzle W, means of supplying a plastic material thereto, and the screw-piston L $i$, provided with the axial hole $i'$, substantially as and for the purposes described.

7. In a machine for working, shaping, and combining plastic materials, the combination of the cylinders D' and E', the screws K $h$ and L $i$, the removable non-revolving nozzle $D^2$, the revolving nozzle or ring $k'$, the tube $D^4$, provided with arms $v'$ and the ring $v$, and the tube $K^2$, fitting loosely into the ring $k'$ and secured to the ring $v$, substantially as and for the purposes described.

8. The combination of the cylinders D' and E', the screws K $h$ and L $i$, the removable non-revolving cone $D^2$, the revolving ring K', the non-revolving tube $D^4$, provided with the ring $v$ and arms $v'$, the tube $K^2$, provided with the inwardly-projecting lip $u'$ and fitted loosely into the ring $k'$ and secured to the ring $v$, and the removable disk X', all arranged and adaped to operate substantially as and for the purposes described.

In testimony whereof I have signed my name to this specification, in the presence of two subscribing witnesses, on this 16th day of January, A. D. 1883.

OLIVER R. CHASE.

Witnesses:
E. A. HEMMENWAY,
WALTER E. LOMBARD.